US009851375B2

(12) United States Patent
Takaoka

(10) Patent No.: US 9,851,375 B2
(45) Date of Patent: Dec. 26, 2017

(54) DETECTION OF DISTRIBUTION BASED ON POSITION INFORMATION

(71) Applicant: SONY CORPORATION, Tokyo (JP)

(72) Inventor: Tomohisa Takaoka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/815,749

(22) Filed: Jul. 31, 2015

(65) Prior Publication Data

US 2015/0338431 A1 Nov. 26, 2015

Related U.S. Application Data

(63) Continuation of application No. 13/396,997, filed on Feb. 15, 2012, now Pat. No. 9,108,651.

(30) Foreign Application Priority Data

Mar. 23, 2011 (JP) ................. 2011-063783

(51) Int. Cl.
*G01L 15/00* (2006.01)
*G01P 15/00* (2006.01)
*B61L 25/02* (2006.01)
*B61L 27/00* (2006.01)
*H04W 4/04* (2009.01)

(52) U.S. Cl.
CPC ............ *G01P 15/00* (2013.01); *B61L 25/025* (2013.01); *B61L 27/0005* (2013.01); *B61L 27/0077* (2013.01); *H04W 4/046* (2013.01)

(58) Field of Classification Search
CPC ............ B60G 17/01908; B61L 25/025; B61L 27/0005; B61L 27/0077; G01P 15/00
See application file for complete search history.

(56) References Cited

U.S. PATENT DOCUMENTS

| | | | |
|---|---|---|---|
| 6,044,698 A * | 4/2000 | Bryan | B61K 9/08 73/146 |
| 7,254,400 B1 | 8/2007 | Sakakura | |
| 7,532,113 B2 | 5/2009 | Horvitz | |
| 7,762,469 B2 | 7/2010 | Sueoka | |
| 2008/0316061 A1* | 12/2008 | Goggin | G06F 3/0346 341/20 |

FOREIGN PATENT DOCUMENTS

| | | |
|---|---|---|
| JP | 2002-193102 A | 7/2002 |
| JP | 2008-234281 A | 10/2008 |
| JP | 2010-072691 A | 4/2010 |
| JP | 2010-231549 A | 10/2010 |

* cited by examiner

*Primary Examiner* — Elias Desta
(74) *Attorney, Agent, or Firm* — Chip Law Group

(57) ABSTRACT

There is provided an information processing apparatus including an extraction section which extracts, out of pieces of detection information each including position information and motion detection data acquired by terminal devices of respective users, detection information of a user on a specific train, based on the position information, and an estimation section which estimates distribution of people on the train based on the motion detection data included in the detection information extracted by the extraction section.

12 Claims, 12 Drawing Sheets

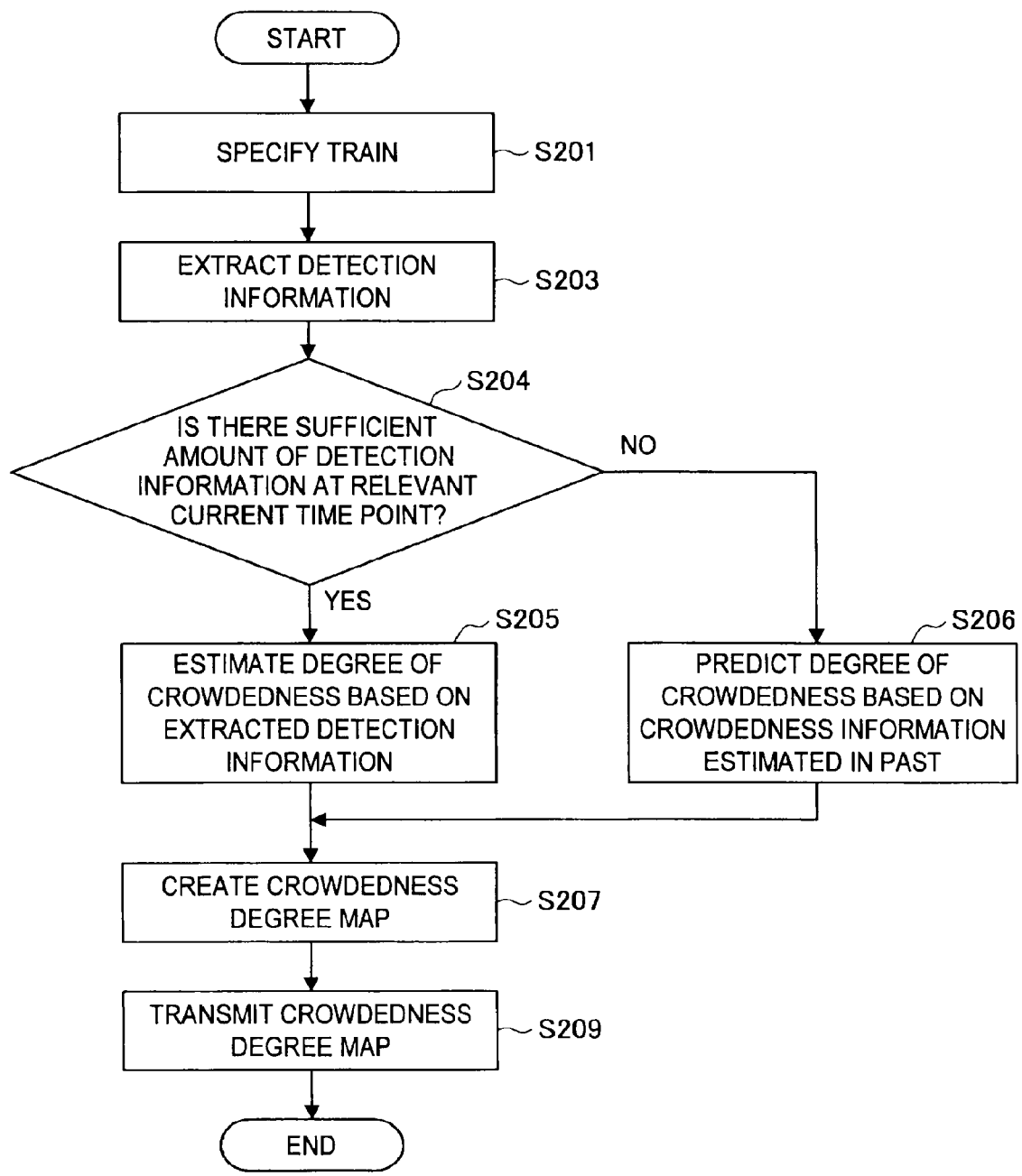

DETECTION OF DISTRIBUTION BASED ON POSITION INFORMATION

CROSS-REFERENCE TO RELATED APPLICATION

The present application is a continuation of U.S. patent application Ser. No. 13/396,997 filed on Feb. 15, 2012 which claims priority of Japanese Patent Appl. No. 2011-063783 filed on Mar. 23, 2011 in the Japanese Patent Office, all of which are incorporated herein by reference.

BACKGROUND

The present disclosure relates to an information processing apparatus, an information processing system, an information processing method, a program, and a recording medium, and more particularly, to an information processing apparatus, an information processing system, an information processing method, a program, and a recording medium, which can estimate the distribution of passengers on a train.

Particularly in an inner city area, there is a tendency that the concentration of people getting on a train is high during commuting time to work or school. Accordingly, the crowdedness of commuter trains during those hours is a social issue. In a train having multiple cars coupled together, there are many cases where a degree of crowdedness differs depending on the position of the car. For example, JP 2002-193102A discloses a system for providing passengers with information of the degree of crowdedness acquired by a sensor installed in the car.

SUMMARY

However, it is necessary that the system described in JP 2002-193102A install at least one sensor in each car, and therefore, a provider who provides the passengers with a crowdedness situation has to pay a large initial investment.

In light of the foregoing, it is desirable to find out the distribution of people on a train based on pieces of information detected by terminal devices carried by respective users.

According to an embodiment of the present disclosure, there is provided an information processing apparatus which includes an extraction section which extracts, out of pieces of detection information each including position information and motion detection data acquired by terminal devices of respective users, detection information of a user on a specific train, based on the position information, and an estimation section which estimates distribution of people on the train based on the motion detection data included in the detection information extracted by the extraction section.

According to another embodiment of the present disclosure, there is provided an information processing system which includes a plurality of first terminal devices each including a position information acquisition section which acquires current position information, a motion detection section which detects motion, and a transmission section which transmits detection information including position information acquired by the position information acquisition section and motion detection data acquired by the motion detection section, and a server device including an extraction section which extracts, out of the pieces of detection information acquired by the first terminal devices, detection information of a user on a specific train, based on the position information, and an estimation section which estimates distribution of people on the train based on the motion detection data included in the detection information extracted by the extraction section.

According to another embodiment of the present disclosure, there is provided an information processing method which includes extracting, out of pieces of detection information each including position information and motion detection data acquired by terminal devices of respective users, detection information of a user on a specific train, based on the position information, and estimating distribution of people on the train based on the motion detection data included in the extracted detection information.

According to another embodiment of the present disclosure, there is provided a program for causing a computer to function as an information processing apparatus including an extraction section which extracts, out of pieces of detection information each including position information and motion detection data acquired by terminal devices of respective users, detection information of a user on a specific train, based on the position information, and an estimation section which estimates distribution of people on the train based on the motion detection data included in the detection information extracted by the extraction section.

According to another embodiment of the present disclosure, there is provided a computer-readable recording medium which records therein a program for causing a computer to function as an information processing apparatus including an extraction section which extracts, out of pieces of detection information each including position information and motion detection data acquired by terminal devices of respective users, detection information of a user on a specific train, based on the position information, and an estimation section which estimates distribution of people on the train based on the motion detection data included in the detection information extracted by the extraction section.

According to the embodiments of the present disclosure described above, the distribution of people on a train can be found out based on pieces of information detected by terminal devices carried by respective users.

BRIEF DESCRIPTION OF THE DRAWINGS

FIG. 12 is a flowchart showing a flow of a crowdedness information providing method according to the embodiment.

DETAILED DESCRIPTION OF THE EMBODIMENT(S)

Figure 1:
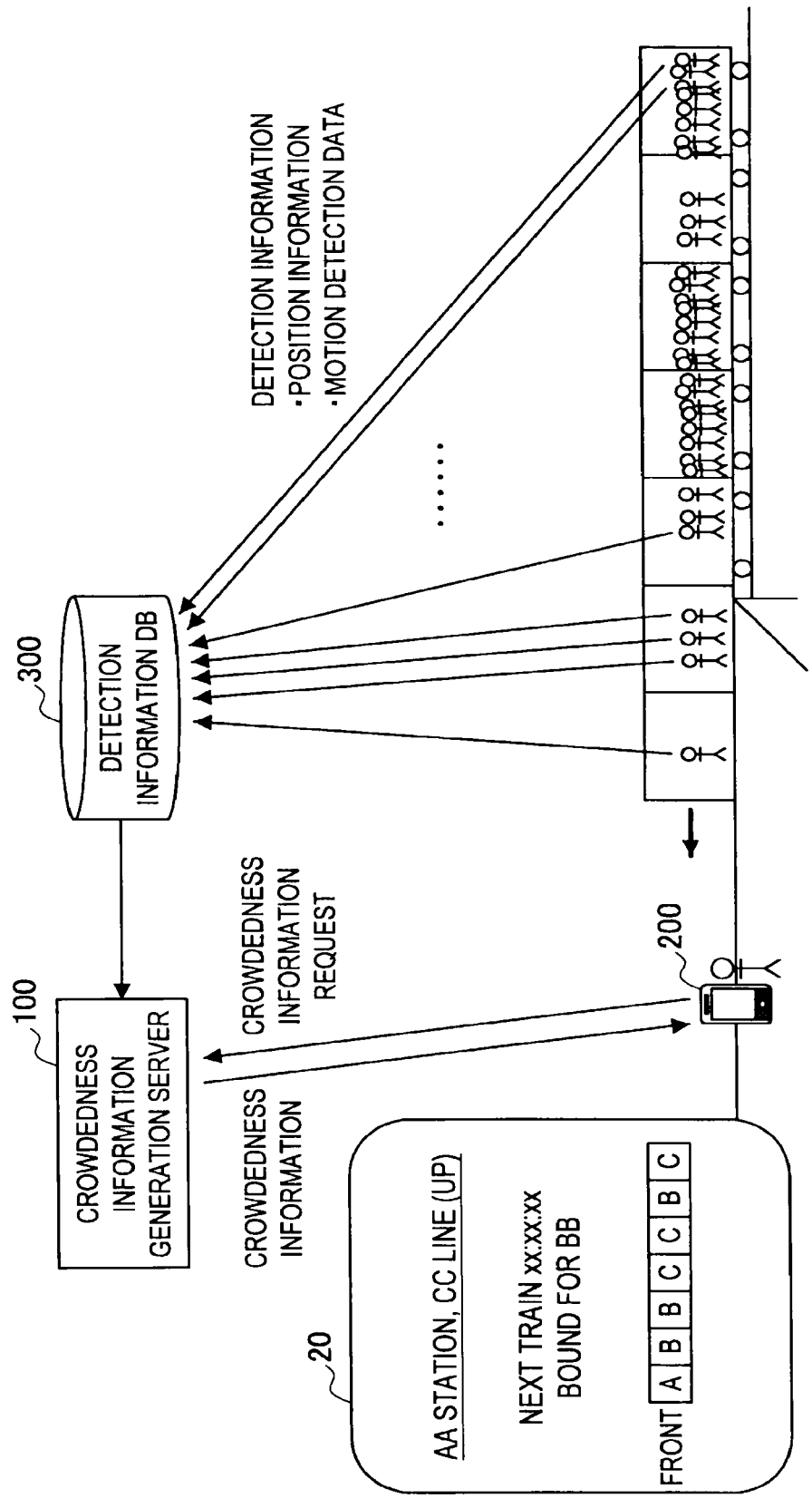
FIG. 1 is an explanatory diagram showing an outline of a crowdedness information providing system according to a first embodiment and a second embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Figure 2:
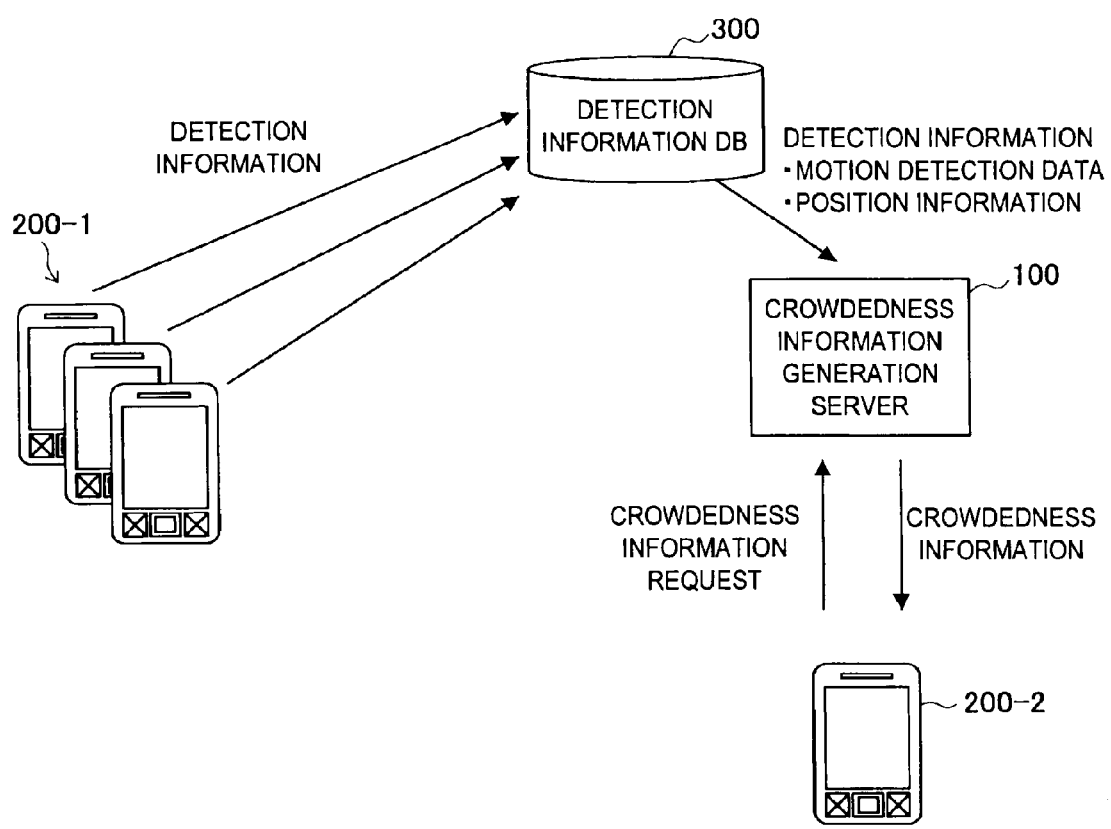
FIG. 2 is a configuration diagram showing a configuration of the crowdedness information providing system according to the embodiments.
Figure 3:
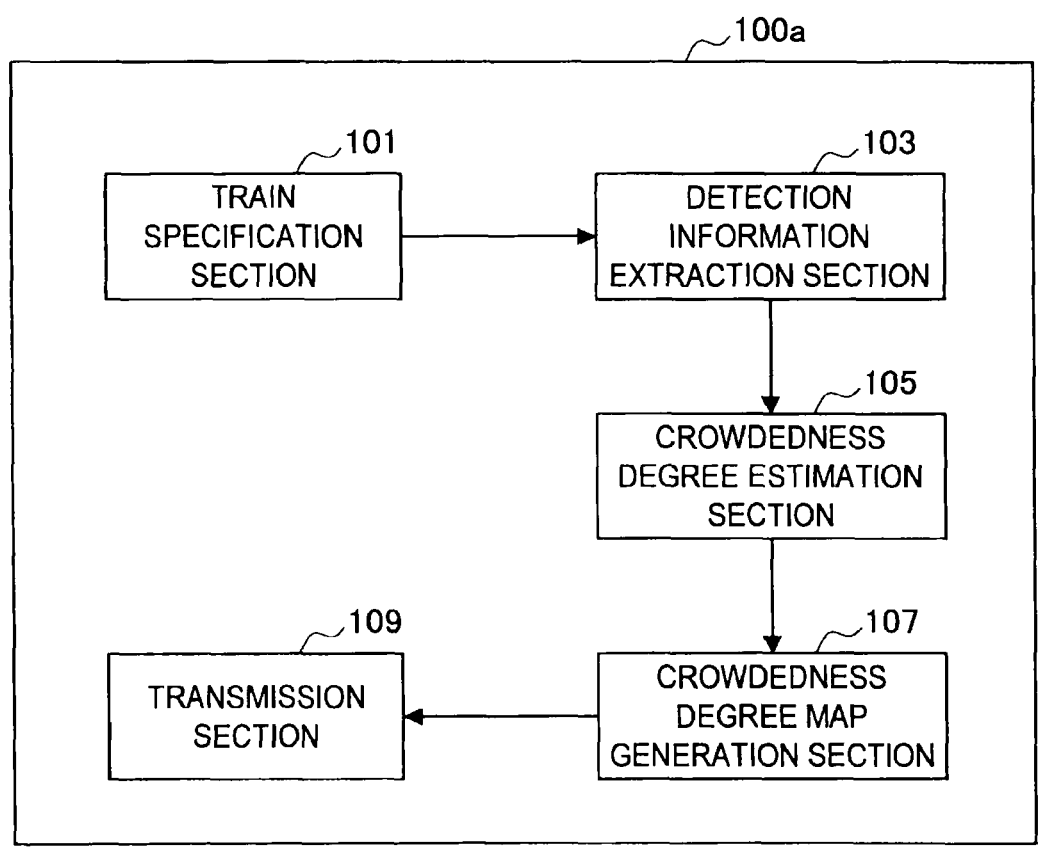
FIG. 3 is a block diagram showing a crowdedness information providing server according to the first embodiment of the present disclosure.

Note that the description will be given in the following order.
1. System outline
2. First embodiment
2-1. Server configuration
2-2. Terminal configuration
2-3. Operation
3. Second embodiment
3-1. Server configuration
3-2. Terminal configuration
3-3. Operation First, with reference to FIG. 1 and FIG. 2, an outline of a crowdedness information providing system according to a first embodiment and a second embodiment of the present disclosure will be described. FIG. 1 is an explanatory diagram showing an outline of a crowdedness information providing system according to a first embodiment and a second embodiment of the present disclosure. FIG. 2 is a configuration diagram showing a configuration of the crowdedness information providing system according to the embodiments.

In the past, there has been disclosed a system that can grasp a crowdedness situation in a train by installing a sensor inside a car or the like of the train. Such a system which requires infrastructure has made an initial investment of a system provider large and has imposed a great burden on the provider.

Incidentally, with the spread of a smartphone and the like, it has become more common that users each carry a terminal device equipped with various types of sensors. Such a terminal device is capable of detecting various types of information related to the terminal device and the user thereof, such as current position information, geomagnetism, motion of the terminal device, a direction, and the like. In addition, it will become more common in the future that the detected information is recorded as a life log of the user. Accordingly, the inventors of the present application have come to consider that the crowdedness situation (distribution of people) inside a train is estimated based on pieces of detection information acquired by the terminal devices that the users carry.

The crowdedness information providing system according to the first and second embodiments of the present disclosure generates crowdedness information inside a specific train based on the pieces of detection information including at least position information and motion detection data of users on the train.

For example, a detection information database (DB) 300 accumulates at regular intervals pieces of detection information detected by a plurality of terminal devices. For example, in a case where a user, who is at a platform, transmits from a terminal device 200 a crowdedness information request to a crowdedness information generation server 100, the crowdedness information generation server 100 extracts, from the detection information DB 300, detection information of a user who is on the specific train specified by the crowdedness information request. Then, the crowdedness information generation server 100 generates crowdedness information within the train based on the extracted detection information, and transmits the generated crowdedness information to the terminal device 200 from which the crowdedness information request has been transmitted.

In this case, the generated crowdedness information may be provided in the way displayed on a crowdedness degree map 20. Here, the degree of crowdedness of each car of the train is displayed in three levels, "A", "B", and "C". "A" represents low crowdedness degree, "C" represents high crowdedness degree, and "B" represents a degree between "A" and "C".

A system configuration of the crowdedness information providing system shown in FIG. 1 will be described with reference to FIG. 2. A crowdedness information providing system 10 includes the crowdedness information generation server 100, the terminal device 200, and the detection information DB 300.

Note that, in this specification and the appended drawings, there are some cases where multiple structural elements that have substantially the same function and structure are distinguished from one another by being denoted with different numbers after the same reference numerals and hyphens. For example, the multiple structural elements that have substantially the same function and structure are distinguished from one another as necessary, like a terminal device 200-1 and a terminal device 200-2. Here, of the terminal devices 200, the terminal device which uploads the detection information is referred to as terminal device 200-1, and the terminal device which transmits the crowdedness information request is referred to as terminal device 200-2. However, this is simply the distinction in accordance with a role at a time point at which the crowdedness information is being provided, and the terminal device 200-2 which transmits the crowdedness information request can take a role of the terminal device 200-1 at another time point. Further, in the case where it is not necessary to distinguish the multiple structural elements that have substantially the same function and structure from one another, the multiple structural elements are denoted with the same reference numeral only. For example, in the case where it is not particularly necessary to distinguish the terminal device 200-1, the terminal device 200-2, and the like from one another, they are each simply referred to as terminal device 200.

Further, in this specification and the appended drawings, there are some cases where multiple structural elements that have substantially the same function and structure are distinguished from one another by being denoted with different alphabets after the same reference numerals. For example, the multiple structural elements that have substantially the same function and structure are distinguished from one another as necessary, like a crowdedness information generation server 100a and a crowdedness information generation server 100b. Note that, in the case where it is not necessary to distinguish the multiple structural elements that have substantially the same function and structure from one another, the multiple structural elements are denoted with the same reference numeral only. For example, in the case where it is not particularly necessary to distinguish the crowdedness information generation server 100a, the crowdedness information generation server 100b, and the like from one another, they are each simply referred to as crowdedness information generation server 100.

The crowdedness information generation server 100 is an example of the information processing apparatus which generates crowdedness information, and when receiving a crowdedness information request of a specific train from the terminal device 200-2, the crowdedness information generation server 100 extracts pieces of detection information of users on the specific train from the detection information DB 300. After that, the crowdedness information generation server 100 generates crowdedness information of the specific train based on the extracted pieces of detection information and transmits the crowdedness information to the terminal device 200-2.

The terminal device 200-1 is an information processing apparatus carried by the user, and uploads at regular intervals detection information to the detection information DB 300. Further, the terminal device 200-2 transmits the crowdedness information request to the crowdedness information generation server 100, and acquires the generated crowdedness information. The terminal device 200 may be an information processing apparatus such as a mobile phone, a notebook personal computer (PC), a personal navigation device (PND), a mobile music playback device, a mobile video processing device, a mobile game console, for example. Note that the detection information DB 300 may be included in a server which is a separate device from the crowdedness information generation server 100, or may be included within the crowdedness information generation server 100. Specific configurations of respective devices for realizing the functions of the crowdedness information providing system 10 will be described below.

2. First Embodiment (2-1. Server Configuration)

First, a crowdedness information generation server 100a according to a first embodiment of the present disclosure mainly includes a train specification section 101, a detection information extraction section 103, a crowdedness degree estimation section 105, a crowdedness degree map generation section 107, and a transmission section 109.

The train specification section 101 has a function of specifying a train based on a crowdedness information request from the terminal device 200-2. The train specification section 101 specifies any one of the trains in a predetermined train timetable, and specifies and supplies the detection information extraction section 103 with information for identifying the specified train and current position information of the specified train. For example, in the case where the identification information of a specific train is included in the crowdedness information request, the train specification section 101 may specify the train based on the identification information. Alternatively, in the case where position information of a user and information of a line and a travelling direction of a train are included in the crowdedness information request, the train specification section 101 may specify a train selected based on the position information of the user, out of the trains of that line running in the specified travelling direction.

The detection information extraction section 103 is an example of an extraction section which extracts detection information of the user on the train specified by the train specification section 101 out of pieces of detection information each including position information and motion detection data acquired by the terminal devices 200 of respective users. The detection information extraction section 103 can extract the detection information of the user on the specific train based on at least the position information. In this case, the detection information extraction section 103 can extract the detection information of the user indicating position information in the vicinity of the current position information of the specific train with which the detection information extraction section 103 is supplied by the train specification section 101. Further, the detection information extraction section 103 may also extract the detection information of the user on the specific train based on movement speed of each user.

The crowdedness degree estimation section 105 is an example of an estimation section which estimates distribution of people on a train based on the pieces of motion detection data of the users extracted by the detection information extraction section 103. The crowdedness degree estimation section 105 specifies positions within the train (relative positions with respect to the total length of the train) of respective users based on time differences between feature points shown in the extracted pieces of motion detection data, and thus can estimate the distribution of people on the train. In addition, the crowdedness degree estimation section 105 can also estimate the car in which each user is present by using information of the number of cars included in the specified train and the length of each car. In this case, the crowdedness degree estimation section 105 may estimate the degree of crowdedness per car. Note that the motion detection data used by the crowdedness degree estimation section 105 is desirably a component in the horizontal direction that is perpendicular to the travelling direction of the train. The detail of crowdedness degree estimation will be described below.

The crowdedness degree map generation section 107 is an example of a crowdedness information generation section which generates crowdedness information that indicates the crowdedness situation of the train specified by the train specification section 101 based on the distribution of people estimated by the crowdedness degree estimation section 105. The crowdedness degree map generation section 107 can generate the crowdedness degree map 20 shown in FIG. 1, for example. Note that, here, the crowdedness degree map in which the degree of crowdedness is visually expressed is provided to the user, but the present technology is not limited to such an example. The crowdedness information indicating the crowdedness situation of the specified train may be provided in any form. The crowdedness degree map generation section 107 supplies the transmission section 109 with the generated crowdedness information.

The transmission section 109 has a function of communicating with an external device. The transmission section 109 can transmit the crowdedness information generated by the crowdedness degree map generation section 107 to the terminal device 200-2.

(2-2. Terminal Configuration)

Figure 4:
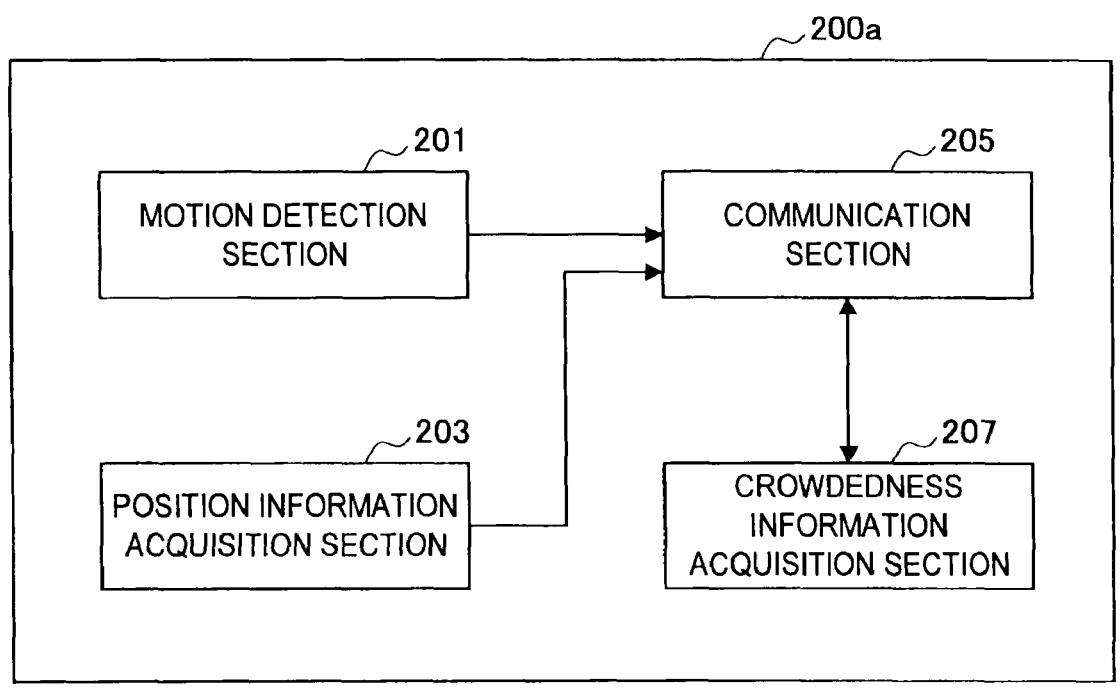
FIG. 4 is a block diagram showing a functional configuration of a terminal device according to the embodiment.
Figure 5:
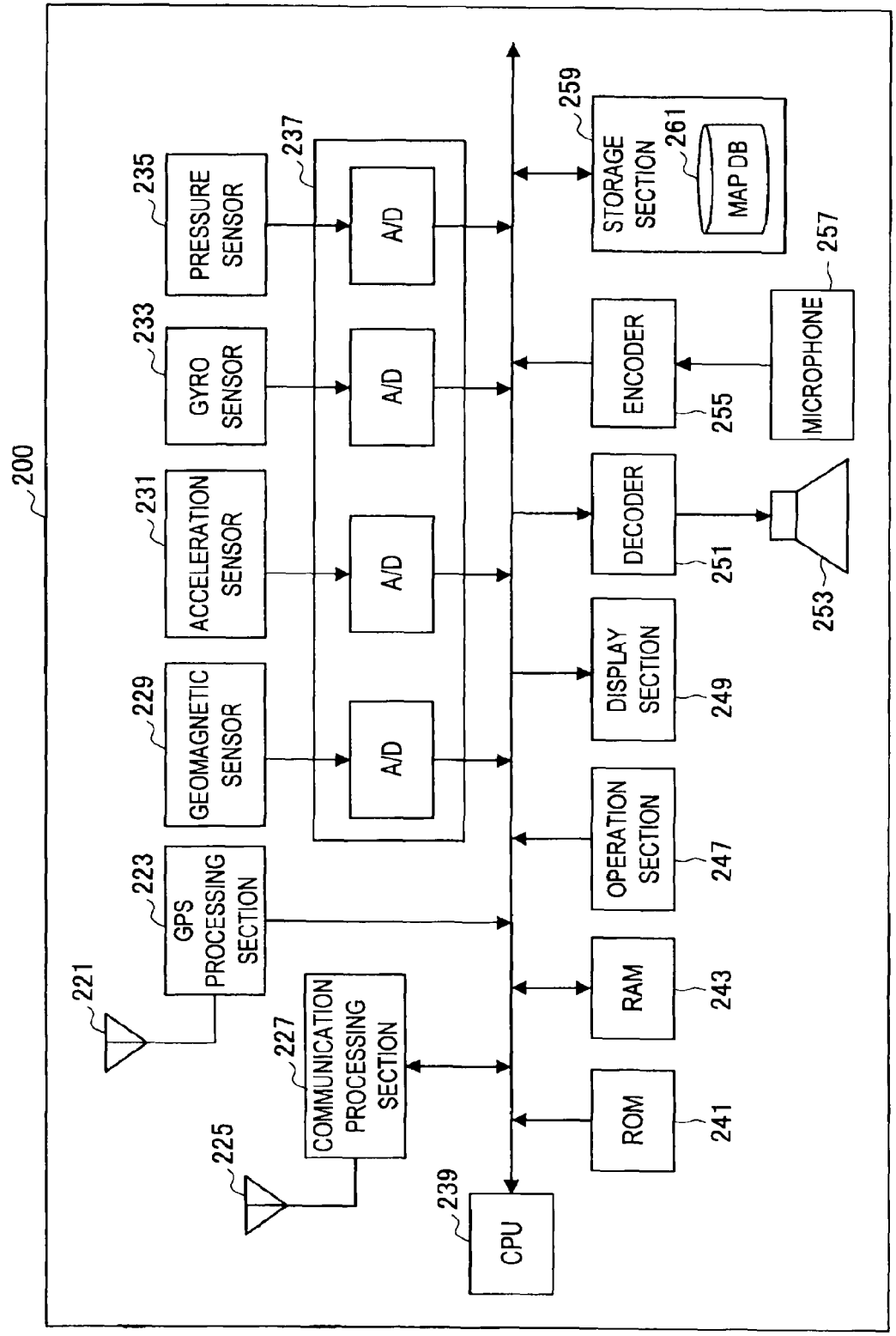
FIG. 5 is a configuration diagram showing an example of a hardware configuration of a terminal device according to the first and second embodiments of the present disclosure.

Next, a configuration of a terminal device 200a according to the present embodiment will be described with reference to FIG. 4 and FIG. 5. FIG. 4 is a block diagram showing a functional configuration of a terminal device according to the embodiment. FIG. 5 is a configuration diagram showing an example of a hardware configuration of a terminal device according to the first and second embodiments of the present disclosure.

First, referring to FIG. 4, the terminal device 200a according to the present embodiment mainly includes a motion detection section 201, a position information acquisition section 203, a communication section 205, and a crowdedness information acquisition section 207. Note that the terminal device 200a can have both functions of the terminal device 200-1 to transmit detection information and of the terminal device 200-2 to transmit a crowdedness information request. However, the present technology is not limited to such a configuration. For example, when the terminal device 200a functions as the terminal device 200-1 which transmits the detection information, the function of the crowdedness information acquisition section 207 may be omitted. Alternatively, when the terminal device 200a functions as the terminal device 200-2 which transmits the crowdedness information request, the function of the motion detection section 201 may be omitted.

The motion detection section 201 has a function of detecting motion of the terminal device 200. For example, the motion detection section 201 may be an inertial sensor such as an acceleration sensor or a gyro sensor. Alternatively, the motion detection section 201 may also be a pressure sensor. The motion detection section 201 outputs the motion detection data obtained by detecting the motion of the terminal device 200.

The position information acquisition section 203 has a function of acquiring current position information. The position information acquisition section 203 may be realized by a GPS (Global Positioning System) antenna and a GPS processing section which calculates position information from a GPS reception signal, for example. Alternatively, the position information acquisition section 203 may have a function of measuring a relative position using various types of sensors. Further, the position information acquisition section 203 may estimate, based on reception strengths of Wi-Fi radio waves received from multiple base stations, distances between the respective base stations and the terminal device 200, and may calculate the current position information based on the triangulation principle using the estimated distances and the pieces of position information of the respective base stations. Alternatively, the position information acquisition section 203 may acquire the current position information based on a combination of base stations which can receive Wi-Fi radio waves.

The communication section 205 is a communication interface configured from a communication device for establishing a connection with a network such as the Internet, for example. Here, the communication section 205 has a radio communication function, and may include a communication antenna for transmitting/receiving a signal for the communication, a processing circuit for performing various types of signal processing for the communication, and the like.

The crowdedness information acquisition section 207 has a function of acquiring crowdedness information generated by the crowdedness information generation server 100. The crowdedness information acquisition section 207 transmits a crowdedness information request to the crowdedness information generation server 100 via the communication section 205. The crowdedness information request includes, for example, information for identifying crowdedness information to be acquired. For example, the information for identifying the crowdedness information to be acquired may include information for identifying a target train and information for identifying a position at which the target train is present when the crowdedness information is acquired. For example, the information for identifying the crowdedness information to be acquired may be information of a line of the train, a name of a station, and the expected time of departure of the train. When transmitting the crowdedness information request, the crowdedness information acquisition section 207 acquires crowdedness information generated by the crowdedness information generation server 100 in accordance with the crowdedness information request.

Heretofore, examples of the functions of the crowdedness information generation server 100a and the terminal device 200a according to the present embodiment have been shown. Each of the above structural elements may be configured using general-purpose members or circuits, or may be configured using hardware specialized for the function of each structural element. Further, the function of each structural element may be realized by reading out, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing each of the functions of the crowdedness information generation server 100a and the terminal device 200a according to the present embodiment as described above, and the computer program can be implemented in a personal computer or the like. Further, there can also be provided a computer-readable recording medium having the computer program stored therein. Examples of the recording medium include a magnetic disk, an optical disc, a magneto-optical disk, and a flash memory. Further, the computer program may be distributed via a network, without using the recording medium, for example.

Here, with reference to FIG. 5, there will be described an example of a hardware configuration of a terminal device 200 according to the first embodiment and the second embodiment of the present disclosure. The terminal device 200 includes a GPS antenna 221, a GPS processing section 223, a communication antenna 225, a communication processing section 227, a geomagnetic sensor 229, an acceleration sensor 231, a gyro sensor 233, a pressure sensor 235, an A/D (Analog/Digital) conversion section 237, a CPU (Central Processing Unit) 239, a ROM (Read Only Memory) 241, a RAM (Random Access Memory) 243, an operation section 247, a display section 249, a decoder 251, a speaker 253, an encoder 255, a microphone 257, and a storage section 259.

The GPS antenna 221 is an example of an antenna which receives a signal from a positioning satellite. The GPS antenna 221 is capable of receiving GPS signals from multiple GPS satellites, and inputs the received GPS signals to the GPS processing section 223. Note that the GPS signals received here include orbital data indicating orbits of the GPS satellites and information such as transmission time of the signals.

The GPS processing section 223 is an example of a calculation section which calculates position information based on the signals received from the positioning satellites. The GPS processing section 223 calculates current position information of the terminal device 200 based on the multiple GPS signals input from the GPS antenna 221, and outputs the calculated position information. To be specific, the GPS processing section 223 calculates positions of the respective GPS satellites based on the orbital data obtained by demodulating the multiple GPS signals, and calculates distances from the respective GPS satellites to the terminal device 200 based on the differences between transmission time and reception time of the GPS signals. Then, based on the calculated positions of the respective GPS satellites and the calculated distances from the respective GPS satellites to the terminal device 200, a current three-dimensional position is calculated. Further, although the positions of the respective GPS satellites are calculated using the orbital data included in the GPS signals here, the present technology is not limited to such an example. For example, the GPS processing section 223 may also calculate the positions of the respective GPS satellites using orbital data acquired from an external server via the communication antenna 225.

The communication antenna 225 is an antenna having a function of receiving a communication signal via a mobile communication network or a wireless LAN (Local Area Network) communication network, for example. The communication antenna 225 can supply the communication processing section 227 with a received signal.

The communication processing section 227 has a function of performing various types of signal processing to the signal supplied by the communication antenna 225. The communication processing section 227 can supply the CPU 239 with a digital signal generated from the supplied analog signal.

The geomagnetic sensor 229 is a sensor for detecting geomagnetism as a voltage value. The geomagnetic sensor 229 may be a 3-axis geomagnetic sensor which detects geomagnetism in the X-axis direction, the Y-axis direction, and the Z-axis direction. Here, for example, the X-axis represents the longitudinal direction of a display screen of the terminal device 200, the Y-axis represents the lateral direction of the display screen, and the Z-axis represents the direction that is perpendicular to the X-axis and the Y-axis. The geomagnetic sensor 229 inputs the detected geomagnetic data to the A/D conversion section 237.

The acceleration sensor 231 is a sensor for detecting acceleration as a voltage value. The acceleration sensor 231 may be a 3-axis acceleration sensor which detects acceleration along the X-axis direction, acceleration along the Y-axis direction, and acceleration along the Z-axis direction. The acceleration sensor 231 inputs the detected acceleration data to the A/D conversion section 237.

The gyro sensor 233 is a measuring instrument for detecting an angle or an angular velocity of an object. The gyro sensor 233 is desirably a 3-axis gyro sensor which detects a variable velocity (angular velocity) of the rotation angle around each of the X-axis, the Y-axis, and the Z-axis as a voltage value. The gyro sensor 233 inputs the detected angular velocity data to the A/D conversion section 237.

The pressure sensor 235 is a sensor for detecting the surrounding pressure as a voltage value. The pressure sensor 235 detects a pressure at a predetermined sampling frequency, and inputs the detected pressure data to the A/D conversion section 237.

The A/D conversion section 237 has a function of converting the input analog signal into a digital signal and outputting the digital signal. The A/D conversion section 237 is a converter circuit for converting an analog signal into a digital signal, for example. Note that the A/D conversion section 237 may be omitted in the case where each sensor has the A/D conversion function.

The CPU 239 functions as an arithmetic processing unit and a control unit and controls the overall operation inside the terminal device 200 according to various programs. Further, the CPU 239 may be a microprocessor. The CPU 239 can realize various functions according to the various programs. For example, the CPU 239 can function as an azimuth calculation section which detects an attitude angle based on the acceleration data detected by the acceleration sensor 231, and then calculates an azimuth using the attitude angle and the geomagnetic data detected by the geomagnetic sensor 229. Further, the CPU 239 can function as a speed calculation section which calculates a speed at which the terminal device 200 moves based on the acceleration data detected by the acceleration sensor 231 and the angular velocity data detected by the gyro sensor 233. Further, the CPU 239 can also function as an altitude calculation section which calculates an altitude of the terminal device 200 based on the pressure data detected by the pressure sensor 235.

The ROM 241 can store programs and arithmetic parameters used by the CPU 239. The RAM 243 temporarily stores programs used during execution of the CPU 239 and parameters that appropriately change during the execution thereof.

The operation section 247 has a function of generating an input signal used by a user for performing a desired operation. For example, the operation section 247 may be configured from, for example, an input section for inputting information by the user, such as a touch panel, a mouse, a keyboard, a button, a microphone, a switch, and a lever, and an input control circuit which generates an input signal based on the input by the user and outputs the generated input signal to the CPU 239.

The display section 249 is an example of an output device, and may be a liquid crystal display (LCD) device, an organic EL (organic light emitting diode (OLED)) display device, or the like. The display section 249 displays a screen to the user, and thereby being able to provide information.

The decoder 251 has a function of performing decoding, analog conversion, and the like of input data in accordance with the control of the CPU 239. For example, the decoder 251 performs decoding, analog conversion, and the like of the audio data input via the communication antenna 225 and the communication processing section 227, and outputs an audio signal to the speaker 253. The speaker 253 can output the audio based on the audio signal supplied from the decoder 251.

The encoder 255 has a function of performing digital conversion, encoding, and the like of input data in accordance with the control of the CPU 239. The encoder 255 can perform digital conversion, encoding, and the like of the audio data input from the microphone 257, and can output the audio data. The microphone 257 can collect and output the audio as an audio signal.

The storage section 259 is a device for storing data, and can include a storage medium, a recording device for recording data in the storage medium, a reading device for reading out the data from the storage medium, and a deletion device for deleting the data recorded in the storage medium. Here, as the storage medium, there may be used a non-volatile memory such as a flash memory, an MRAM (Magnetoresistive Random Access Memory), a FeRAM (Ferroelectric Random Access Memory), a PRAM (Phase change Random Access Memory), and an EEPROM (Electronically Erasable and Programmable Read Only Memory), and a magnetic recording medium such as an HDD (Hard Disk Drive). The storage section 259 can store a map DB 261, for example. The map DB 261 can include various types of information associated with position information, such as information of POI (Point Of Interest), altitude information, and road information. Note that, although the map DB 261 is included in the terminal device 200 here, the present technology is not limited to such an example. The map DB 261 may be included in an external device. The terminal device 200 may have a configuration such that the terminal device 200 accesses the map DB 261 included in the external device as appropriate and thereby acquiring various types of information associated with the position information.

(2-3. Operation)

Figure 6:
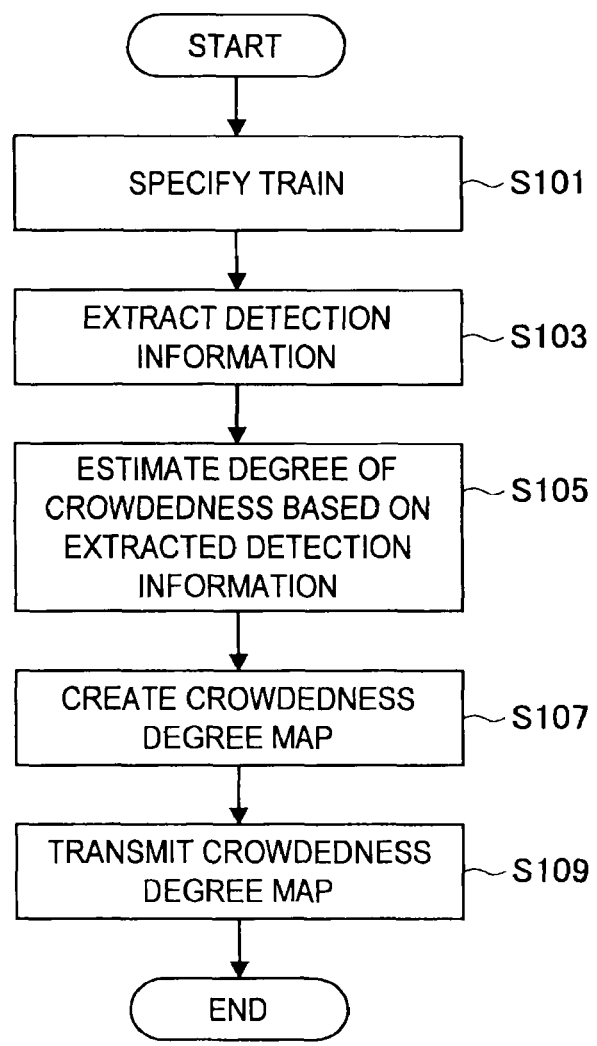
FIG. 6 is a flowchart showing a flow of a crowdedness information providing method according to the embodiments.
Figure 7:
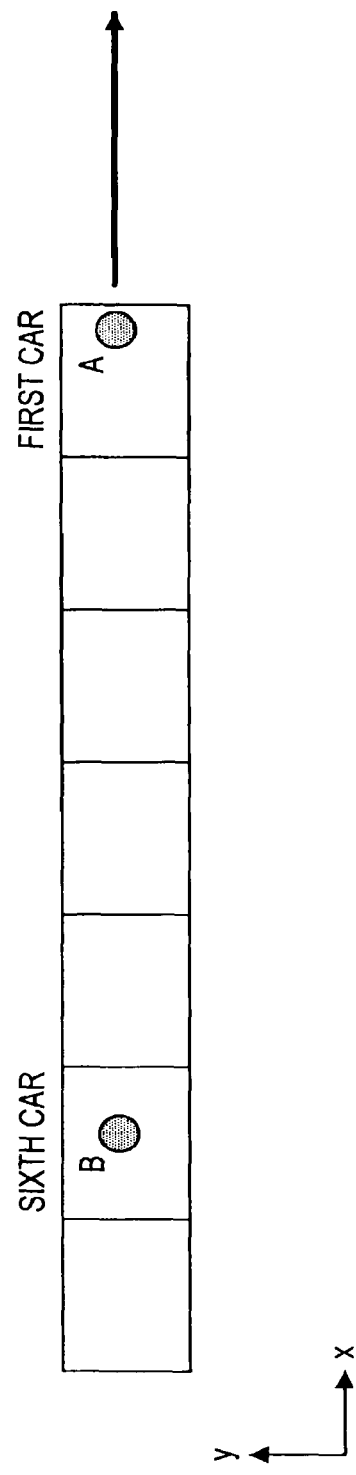
FIG. 7 is an explanatory diagram illustrating an example of detection information.
Figure 8:
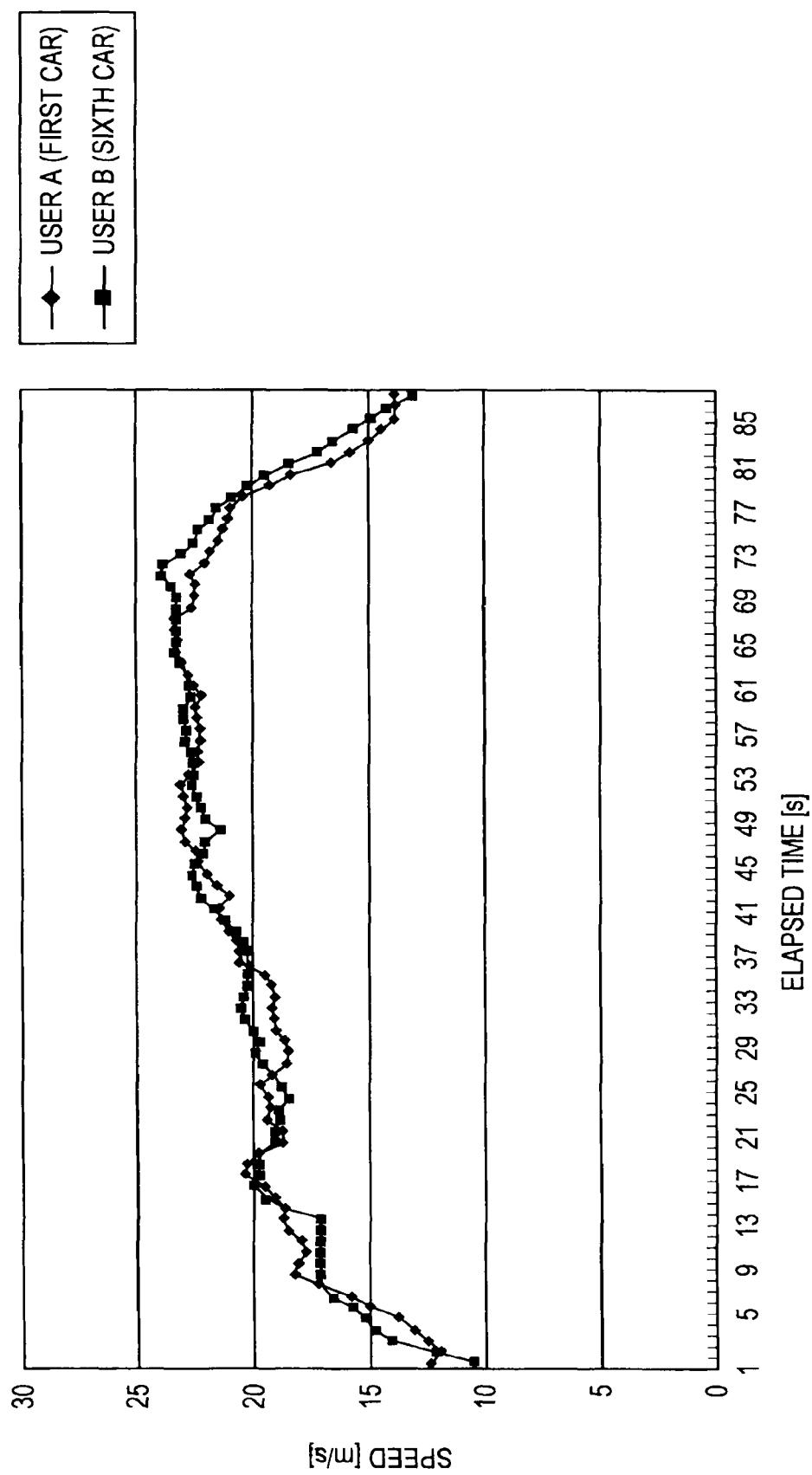
FIG. 8 is a graph showing an example of movement speeds of users on the same train.
Figure 9:
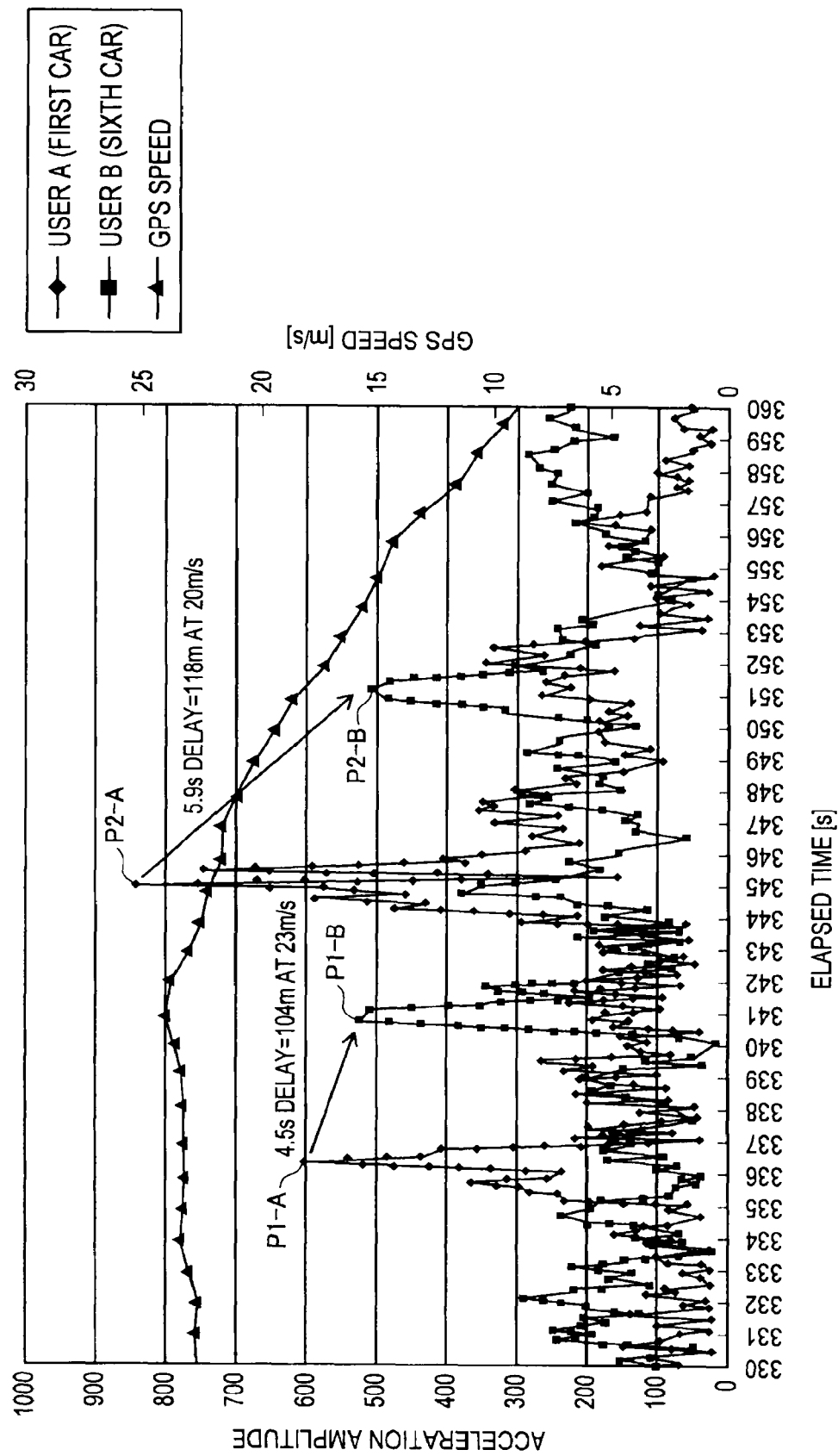
FIG. 9 is a graph showing an example of motion detection data of users in different cars from each other of the same train.

Next, with reference to FIGS. 6 to 9, there will be described operation of the crowdedness information generation server 100a realized by the functional configuration described above. FIG. 6 is a flowchart showing a flow of a crowdedness information providing method according to the embodiment. FIG. 7 is an explanatory diagram illustrating an example of detection information. FIG. 8 is a graph showing an example of movement speeds of users on the same train. FIG. 9 is a graph showing an example of motion detection data of users in different cars from each other of the same train.

First, when receiving a crowdedness information request from the terminal device 200-2, the train specification section 101 of the crowdedness information generation server 100a specifies a train to be a target based on information included in the received crowdedness information request (S101). Here, the train specification section 101 specifies the train to be a target based on a line, a station name, and the expected time of leaving the station included in the crowdedness information request, for example.

Next, the detection information extraction section 103 extracts detection information of a user on the train specified by the train specification section 101 out of the pieces of detection information collected in the detection information DB 300 (S103). In this case, the detection information extraction section 103 can extract the detection information based on at least position information. Specifically, the detection information extraction section 103 may acquire the current position information of the train specified by the train specification section 101, and may extract the detection information which has position information that is near to the position of the train. Further, the detection information extraction section 103 may also use information of movement speed included in the detection information. For example, FIG. 8 shows the data of movement speed of a user A, who is on the first car of a train, and the data of movement speed of a user B, who is on the sixth car of the same train as the train which the user A is on, as shown in FIG. 7. As is shown here, the pieces of information of movement speed acquired by the terminal devices 200 carried by the users on the same train are similar to each other, regardless of which cars the users are on. Accordingly, the detection information extraction section 103 may extract the pieces of detection information which have similar movement speed out of the pieces of detection information extracted based on position information. According to such a configuration, it can be prevented that a user who is at a position nearby but is not on the train is erroneously extracted. Note that the information of movement speed may be information calculated from transition of the position information, for example. Alternatively, the information of movement speed may be information calculated based on a value detected by a sensor included in the terminal device 200. Note that motion detection data used here is desirably data from which the influence of motion caused by the shape of a railway track can be easily detected, and may be data in the horizontal direction (Y-axis direction in FIG. 7) that is perpendicular to the travelling direction of the train.

Next, the crowdedness degree estimation section 105 estimates a degree of crowdedness of the target train based on the motion detection data included in the detection information extracted by the detection information extraction section 103 (S105). Here, the degree of crowdedness estimated by the crowdedness degree estimation section 105 may be information indicating at least distribution of people on the train. Further, the crowdedness degree estimation section 105 may estimate distribution of people per car of the train.

Here, the detail of the degree of crowdedness estimation performed by the crowdedness degree estimation section 105 will be described by way of a specific example. FIG. 9 shows the motion detection data of the user A and the user B shown in FIG. 7 and the transition of the GPS speed. The pieces of motion detection data acquired by respective terminal devices 200 carried by users on the same train include feature points each indicating an influence of swaying motion caused by the shape (for example, curve) of the railway track. Such a feature point is detected in passing through a point on the railway track that causes swaying motion. Accordingly, the time difference between feature points is the difference between the time points that the respective terminal devices 200 passes through the point. Therefore, by using the time difference and the movement speed at that time, the crowdedness degree estimation section 105 can calculate a distance between the terminal devices 200.

For example, let us focus on feature points P1-A, P1-B, P2-A, and P2-B shown in FIG. 9. It is assumed that P1-A and P1-B are feature points detected at the time point at which the user A and the user B pass through the same point, respectively, and P2-A and P2-B are feature points detected at the time point at which the user A and the user B pass through the same point, respectively. The time difference between the feature points P1-A and P1-B is about 4.5 seconds. If the movement speed therebetween is 23 m/s, the distance between the user A and the user B is calculated to be about 104 m. Further, the time difference between the feature points P2-A and P2-B is about 5.9 seconds. If the movement speed therebetween is 20 m/s, the distance between the user A and the user B is calculated to be about 118 m.

In this way, the crowdedness degree estimation section 105 can calculate a distance between the terminal devices 200 by using the time difference between the feature points and the movement speed. For example, there is considered a situation as an assumption that a fixed percentage of passengers out of the passengers on the train are uploading the detection information to the detection information DB 300. In this case, the crowdedness degree estimation section 105 can determine a piece of detection information to be used as a reference out of the pieces of detection information extracted by the detection information extraction section 103. The detection information to be a reference can be the detection information of the user at a position nearest to the head of the train, for example. For example, the crowdedness degree estimation section 105 may use the motion detection data that detects an influence of swaying motion first as the reference. Then, the crowdedness degree estimation section 105 calculates a distance between the terminal devices 200 based on the time difference between the detection time of the feature point of each motion detection data and the detection time of the feature point of the reference motion detection data. In this case, the crowdedness degree estimation section 105 may perform the same processing to multiple feature points, and thereby calculating multiple distances between two terminal devices and performing leveling processing. Note that the time difference can be detected by making two pieces of motion detection data correlated with each other. Alternatively, the time difference can also be detected by making two pieces of motion detection data correlated with each other after detecting a feature point caused by a large swaying motion.

By repeating the same processing to multiple pieces of motion detection data, the crowdedness degree estimation section 105 acquires information indicating positions of respective terminal devices 200 (i.e., distribution of people) relative to the terminal device 200 which detected the reference detection information. Here, the crowdedness degree estimation section 105 can estimate the distribution of people per car by using the number of cars included in the train and the length of each car. For example, let us assume that the reference terminal device 200 is located at the head of the first car. In this case, in the case where the length of each car is 20 m, the crowdedness degree estimation section 105 may estimate as follows: the terminal device 200 is in the first car if the distance thereof from the reference terminal device 200 is 0 to 20 m; the terminal device 200 is in the second car if the distance thereof from the reference terminal device 200 is 20 to 40 m; the terminal device 200 is in the third car if the distance thereof from the reference terminal device 200 is 40 to 60 m; the terminal device 200 is in the fourth car if the distance thereof from the reference terminal device 200 is 60 to 80 m; the terminal device 200 is in the fifth car if the distance thereof from the reference terminal device 200 is 80 to 100 m; the terminal device 200 is in the sixth car if the distance thereof from the reference terminal device 200 is 100 to 120 m; and the terminal device 200 is in the seventh car if the distance thereof from the reference terminal device 200 is 120 to 140 m.

Note that, here, the description has been made in the case of using motion detection data obtained by the acceleration sensor 231, but the present technology is not limited to such an example. For example, there may be used the detection data obtained by various sensors that can detect motion, such as the gyro sensor 233 and the pressure sensor 235. Further, by specifying the orientation of the terminal device 200, it is preferred that a scalar quantity of a component of the horizontal direction that is perpendicular to the travelling direction of the train be used, out of the motion detection data. The acceleration in the travelling direction of the train should be the same for the users on the same train. Accordingly, for example, the orientation of the terminal device 200 may be specified by specifying the gravity direction and the travelling direction of the train based on a detection value of the acceleration sensor 231. Alternatively, the orientation of the terminal device 200 may be specified using an electromagnetic compass function realized by the geomagnetic sensor 229 and the acceleration sensor 231. Further, the detection accuracy can be enhanced by extracting a band including the detection value caused by the influence of motion using various types of filters, out of the motion detection data.

Returning to FIG. 6 again, the crowdedness degree map generation section 107 generates crowdedness degree information of the train specified in Step S101 by using the information of degree of crowdedness estimated by the crowdedness degree estimation section 105 (S107). The crowdedness degree information may be a crowdedness degree map. The crowdedness degree map expresses visually the distribution of people. For example, the crowdedness degree map may include a graph indicating the distribution of people. Alternatively, in the crowdedness degree map, the degree of crowdedness may be shown with "A", "B", and "C" as shown in FIG. 1.

When the crowdedness degree map generation section 107 generates the crowdedness degree map, the transmission section 109 transmits the generated crowdedness degree map to the terminal device 200-1 from which the crowdedness information request has been transmitted (S109).

According to the crowdedness information generation server 100 of the first embodiment described above, the information of degree of crowdedness (distribution of people) on a train can be generated based on the pieces of motion detection data acquired by the terminal devices 200-1 carried by passengers on the train.

3. Second Embodiment

Next, a second embodiment of the present disclosure will be described. Hereinafter, differences with the first embodiment will be mainly described, and description of the parts in common therewith will be omitted.

(3-1. Server Configuration)

Figure 10:
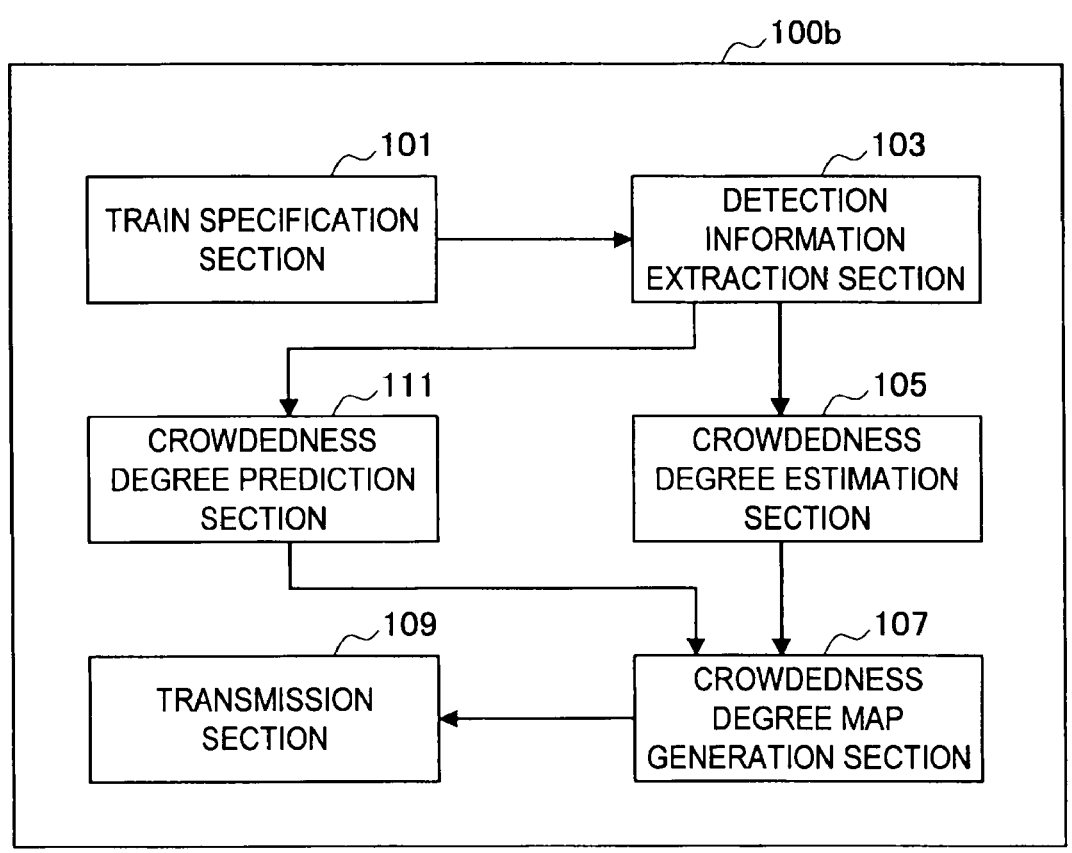
FIG. 10 is a block diagram showing a functional configuration of a crowdedness information providing server according to the second embodiment of the present disclosure.

With reference to FIG. 10, a configuration of a crowdedness information generation server 100*b* according to the second embodiment of the present disclosure will be described. FIG. 10 is a block diagram showing a functional configuration of a crowdedness information providing server according to the second embodiment of the present disclosure. The crowdedness information generation server 100*b* includes a train specification section 101, a detection information extraction section 103, a crowdedness degree estimation section 105, a crowdedness degree map generation section 107, a transmission section 109, and a crowdedness degree prediction section 111.

The detection information extraction section 103 is an example of an extraction section which extracts detection information of the user on the train specified by the train specification section 101 out of pieces of detection information each including position information and motion detection data acquired by the terminal devices 200 of respective users. The detection information extraction section 103 extracts the detection information, and then counts the number of the extracted pieces of detection information. Then, in the case where the number of extracted pieces of detection information is sufficient, the detection information extraction section 103 can supply the crowdedness degree estimation section 105 with the extracted detection information. On the other hand, in the case where the number of extracted pieces of detection information is not sufficient, the detection information extraction section 103 can instruct the crowdedness degree prediction section 111 to predict the degree of crowdedness.

The crowdedness degree prediction section 111 can predict the distribution of people on the train specified by the train specification section 101 using information of distribution of people that has been estimated in the past based on the motion detection data. The crowdedness degree prediction section 111 predicts the degree of crowdedness at a current time point of a train running in accordance with the same train timetable as that the train specified by the train specification section 101 is running in accordance with, based on the detection information which has been extracted in the past and the information of degree of crowdedness which has been estimated in the past.

The crowdedness degree map generation section 107 generates a crowdedness degree map based on the information of degree of crowdedness supplied from the crowdedness degree estimation section 105 or the crowdedness degree prediction section 111.

(3-2. Terminal Configuration)

Figure 11:
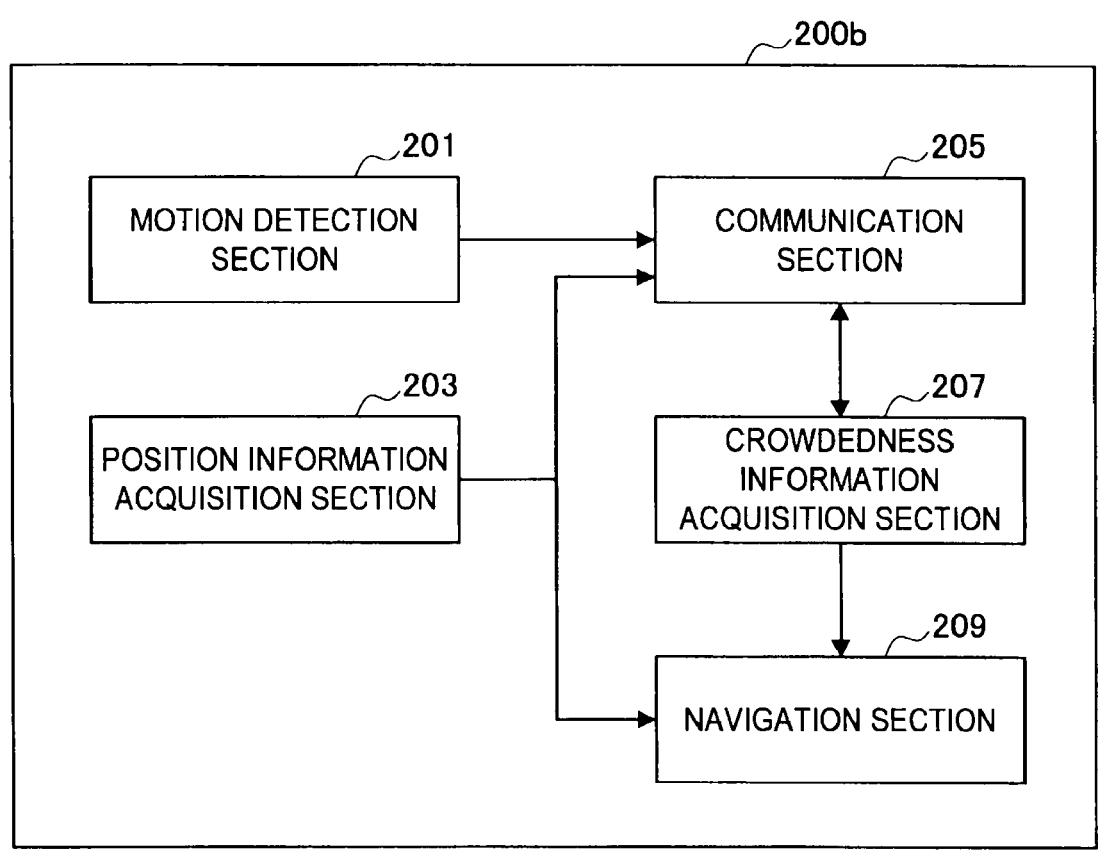
FIG. 11 is a block diagram showing a functional configuration of a terminal device according to the embodiment.

Further, the terminal device 200 may have a configuration of the terminal device 200*b* shown in FIG. 11. FIG. 11 is a block diagram showing a functional configuration of a terminal device according to the embodiment. The terminal device 200b according to the second embodiment includes a navigation section 209 in addition to the configuration of the terminal device 200a according to the first embodiment.

The navigation section 209 has a function of showing a route from a current position to a destination, for example, by using the position information acquired by the position information acquisition section 203. The navigation section 209 can also show the route based on the crowdedness information acquired by the crowdedness information acquisition section 207. For example, the navigation section 209 can show a route for getting on an uncrowded car based on the crowdedness information. Further, the navigation section 209 may select, in the case where there are multiple lines available for reaching the destination, a line that is free from crowd, and may provide the user with the route using the selected line.

Note that, in order that the terminal device 200b uses the crowdedness information even when the user is outside service range (for example, at underground), the crowdedness information acquisition section 207 may acquire in advance crowdedness information, which is a prediction result, and may cause the storage section 259 included in the terminal device 200b to store the crowdedness information.

Heretofore, there have been shown examples of the functions of the crowdedness information generation server 100a and the terminal device 200a according to the present embodiment. Each of the above structural elements may be configured using general-purpose members or circuits, or may be configured using hardware specialized for the function of each structural element. Further, the function of each structural element may be realized by reading out, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing each function of the crowdedness information generation server 100a and the terminal device 200a according to the present embodiment as described above, and the computer program can be implemented in a personal computer or the like. Further, there can also be provided a computer-readable recording medium having the computer program stored therein. Examples of the recording medium include a magnetic disk, an optical disc, a magneto-optical disk, and a flash memory. Further, the computer program may be distributed via a network, without using the recording medium, for example.

(3-3. Operation)

Next, with reference to FIG. 12, a crowdedness information providing method according to the second embodiment of the present disclosure will be described. FIG. 12 is a flowchart showing a flow of the crowdedness information providing method according to the embodiment.

First, when receiving a crowdedness information request from the terminal device 200-2, the train specification section 101 of the crowdedness information generation server 100b specifies a train to be a target based on information included in the received crowdedness information request (S201).

Next, the detection information extraction section 103 extracts detection information of a user on the train specified by the train specification section 101 out of the pieces of detection information collected in the detection information DB 300 (S203). Then, the detection information extraction section 103 determines whether there is a sufficient amount of detection information at the relevant current time point (S204). In the case where there is a sufficient amount of detection information at the relevant current time point, the crowdedness degree estimation section 105 estimates a degree of crowdedness based on the extracted detection information (S205). On the other hand, in the case where there is not a sufficient amount of detection information at the relevant current time point, the crowdedness degree prediction section 111 predicts the degree of crowdedness based on detection information that has been extracted in the past and crowdedness information that has been estimated in the past (S206).

After that, the crowdedness degree map generation section 107 creates a crowdedness degree map based on the information of degree of crowdedness generated in Step S205 or Step S206 (S207). When the crowdedness degree map generation section 107 generates the crowdedness degree map, the transmission section 109 transmits the generated crowdedness degree map to the terminal device 200-1 from which the crowdedness information request has been transmitted (S209).

It should be understood by those skilled in the art that various modifications, combinations, sub-combinations and alterations may occur depending on design requirements and other factors insofar as they are within the scope of the appended claims or the equivalents thereof.

For example, although the detection value of acceleration has been used as an example of the motion detection data shown in FIG. 9 in the embodiments described above, the present technology is not limited to such an example. For example, the motion detection data may be detection data acquired by a gyro sensor, a pressure sensor, or the like.

Further, although the embodiments described above have used configuration in which the crowdedness degree map is created in response to the crowdedness information request from the terminal device 200-2, the present technology is not limited to such an example. The information of degree of crowdedness may be generated in response to any trigger. For example, the crowdedness information generation server 100 may generate crowdedness information for all trains each time the trains leave a station, regardless of presence/absence of a request. The crowdedness information generation server 100 can transmit crowdedness information which is generated in advance in response to the request from the terminal device 200-2.

Further, in the embodiments described above, the detection information DB 300 is included in a device which is a separate device from the crowdedness information generation server 100, but the present technology is not limited to such an example. The crowdedness information generation server 100 may include the detection information DB 300.

Further, in the embodiments described above, the motion detection data, the position information, and the speed information have been exemplified as the information collected in the detection information DB 300, but the information is not limited thereto. The detection information DB 300 can store, as a life log of the user, every piece of information that can be acquired by the terminal device 200 in association with time information. Further, in the embodiments described above, the information collected in the detection information DB 300 has been used for generating the crowdedness information. However, the information of time difference measured by the crowdedness degree estimation section 105 in the embodiments described above can be used as information indicating transmission of the swaying motion inside the train. For example, the information of the time difference may be used for predicting the arrival of swaying motion. The information of the motion arrival prediction may be used for making an announcement for each car of the train, like "This train will lurch. Please hold on to a strap or a handhold". By alerting the user in advance, falls inside the train can be prevented. Further, pieces of data of swaying motion felt by passengers are collected in the detection information DB 300. By analyzing the data, there can be obtained information of the position with large swaying motion and information of a change over the years of swaying motion condition. For example, those pieces of information can be referred to when a railway company carrying out a maintenance.

Further, in the embodiments described above, the terminal device 200*b* including the navigation section 209 has been used in combination with the crowdedness information generation server 100*b* having the function of predicting a degree of crowdedness, but the present technology is not limited to such an example. For example, the terminal device 200*b* may transmit the crowdedness information request to the crowdedness information generation server 100*a*. However, by using the crowdedness information generation server 100*b* having the function of predicting a degree of crowdedness and the terminal device 200*b* having the navigation function in combination, the terminal device 200*b* can show a route using the predicted degree of crowdedness. Accordingly, there is an effect that this can be applied even to the case where the current time and the time to get on the train are far apart.

Further, although the embodiments described above used GPS as an example of the positioning satellite, the positioning satellite is of course not limited to the GPS. The positioning satellite may be various types of positioning satellites such as Galileo, GLONASS, COMPASS, and MICHIBIKI. In this case, one type of positioning satellite may be used, or positioning signals obtained from multiple types of satellites may be used in combination. The configuration to be used for acquiring position information can be changed appropriately in accordance with the technical level each time when the embodiment is carried out.

Note that in the present specification, the steps written in the flowchart may of course be processed in chronological order in accordance with the stated order, but may not necessarily be processed in the chronological order, and may be processed individually or in a parallel manner. It is needless to say that, in the case where the steps are processed in the chronological order, the order of the steps may be changed appropriately according to circumstances.

Additionally, the present technology may also be configured as below.

(1) An information processing apparatus including:

an extraction section which extracts, out of pieces of detection information each including position information and motion detection data acquired by terminal devices of respective users, detection information of a user on a specific train, based on the position information; and an estimation section which estimates distribution of people on the train based on the motion detection data included in the detection information extracted by the extraction section.

(2) The information processing apparatus according to (1), wherein the estimation section estimates the distribution of people on the train by estimating positions of respective users on the train based on phase differences of the plurality of pieces of motion detection data extracted by the extraction section.

(3) The information processing apparatus according to (2), wherein the estimation section estimates the positions of respective users on the train by determining a user to be a reference and by calculating distances between respective sets of terminal devices based on phase differences between motion detection data of the user to be a reference and respective pieces of motion detection data, and movement speed.

(4) The information processing apparatus according to (1), wherein the estimation section estimates the distribution of people on the train by estimating positions of respective users on the train based on time differences between feature points shown in the plurality of pieces of motion detection data extracted by the extraction section.

(5) The information processing apparatus according to (4), wherein the estimation section estimates the positions of respective users on the train by determining a user to be a reference and by calculating distances between respective sets of terminal devices based on time differences between a feature point shown in motion detection data of the user to be a reference and feature points shown in respective pieces of motion detection data, and movement speed.

(6) The information processing apparatus according to any one of (1) to (5),
wherein the estimation section estimates, using information of a number of cars included in the train and a length of each of the cars, distribution of people per car.

(7) The information processing apparatus according to any one of (1) to (6),
wherein the estimation section estimates the distribution of people on the train based on data in a horizontal direction that is perpendicular to a travelling direction of the train, out of the pieces of motion detection data.

(8) The information processing apparatus according to any one of (1) to (7), further including:
a prediction section which predicts the distribution of people on the specific train based on the distribution of people that has been estimated in the past from the motion detection data with respect to a train running in accordance with a train timetable, the train timetable being the same as that the specific train is running in accordance with.

(9) The information processing apparatus according to any one of (1) to (8), further including:
a crowdedness information generation section which generates crowdedness information of the specific train based on distribution of people estimated by the estimation section.

(10) The information processing apparatus according to (9), further including:
a train determination section which receives a crowdedness information request including information for determining the specific train, and determines the specific train; and
a transmission section which transmits the crowdedness information generated by the crowdedness information generation section to a terminal device which transmitted the crowdedness information request.

(11) The information processing apparatus according to any one of (1) to (10),
wherein the extraction section extracts detection information of a user on the specific train further based on information of movement speed of each user.

(12) An information processing system including:
a plurality of first terminal devices each including a position information acquisition section which acquires current position information, a motion detection section which detects motion, and a transmission section which transmits detection information including position information acquired by the position information acquisition section and motion detection data acquired by the motion detection section; and a server device including an extraction section which extracts, out of the pieces of detection information acquired by the first terminal devices, detection information of a user on a specific train, based on the position information, and an estimation section which estimates distribution of people on the train based on the motion detection data included in the detection information extracted by the extraction section.

(13) The information processing system according to (12), further including:

a second terminal device including a crowdedness information acquisition section which transmits a crowdedness information request including information for determining the specific train to the server device, and acquires crowdedness information generated in response to the crowdedness information request, wherein the extraction section extracts the detection information of a user on the specific train in response to the crowdedness information request, and wherein the server device further includes a crowdedness information generation section which generates the crowdedness information based on distribution of people estimated by the estimation section, and a transmission section which transmits the crowdedness information generated by the crowdedness information generation section to the second terminal device.

(14) The information processing system according to (13), wherein the second terminal device further includes a navigation section which shows a route based on the crowdedness information acquired by the crowdedness information acquisition section.

(15) An information processing method including:

extracting, out of pieces of detection information each including position information and motion detection data acquired by terminal devices of respective users, detection information of a user on a specific train, based on the position information; and estimating distribution of people on the train based on the motion detection data included in the extracted detection information.

(16) A program for causing a computer to function as an information processing apparatus including an extraction section which extracts, out of pieces of detection information each including position information and motion detection data acquired by terminal devices of respective users, detection information of a user on a specific train, based on the position information, and an estimation section which estimates distribution of people on the train based on the motion detection data included in the detection information extracted by the extraction section.

(17) A computer-readable recording medium which records therein a program for causing a computer to function as an information processing apparatus including an extraction section which extracts, out of pieces of detection information each including position information and motion detection data acquired by terminal devices of respective users, detection information of a user on a specific train, based on the position information, and an estimation section which estimates distribution of people on the train based on the motion detection data included in the detection information extracted by the extraction section.

The invention claimed is:

1. An information processing apparatus, comprising:
circuitry configured to:
retrieve acceleration information and position information, from a plurality of terminal devices;
generate motion information based on the acceleration information and the position information;
transmit, based on the position information related to the motion information, the motion information to a terminal device of the plurality of terminal devices; and
generate a motion map, based on the position information of the plurality of terminal devices,
wherein the motion map includes a graph that corresponds to a distribution associated with each terminal device of the plurality of terminal devices.

2. The information processing apparatus according to claim 1, wherein the acceleration information indicates a swaying motion of people.

3. The information processing apparatus according to claim 1,
wherein the circuitry is further configured to display the motion map,
wherein the motion map contains the position information within one of a range from a current position of the information processing apparatus or within a route provided by the information processing apparatus.

4. The information processing apparatus according to claim 1, wherein the circuitry is further configured to warn of a possible swaying motion based on the position information, associated with the motion information, within a range from a current position of the information processing apparatus.

5. An information processing method executed by circuitry of an information processing apparatus, comprising:
retrieving acceleration information and position information from a plurality of terminal devices;
generating motion information based on the acceleration information and the position information;
transmitting, based on the position information related to the motion information, the motion information to a terminal device of the plurality of terminal devices; and
generating a motion map, based on the position information of the plurality of terminal devices,
wherein the motion map includes a graph that corresponds to a distribution associated with each terminal device of the plurality of terminal devices.

6. The information processing method according to claim 5, wherein the acceleration information indicates a swaying motion of people.

7. The information processing method according to claim 5, further comprising displaying the motion map,
wherein the motion map contains the position information within one of a range from a current position of the information processing apparatus or within a route provided by the information processing apparatus.

8. The information processing method according to claim 5, further comprising warning of a possible swaying motion based on the position information, associated with the motion information, within a range from a current position of the information processing apparatus.

9. A non-transitory computer-readable medium having stored thereon computer-executable instructions that, when executed by a processor, cause a computer to perform operations, the operations comprising:
retrieving acceleration information and position information from a plurality of terminal devices;
generating motion information based on the acceleration information and the position information;
transmitting, based on the position information related to the motion information, the motion information to a terminal device of the plurality of terminal devices; and
generating a motion map, based on the position information of the plurality of terminal devices,
wherein the motion map includes a graph that corresponds to a distribution associated with each terminal device of the plurality of terminal devices.

10. The non-transitory computer-readable medium according to claim 9, wherein the acceleration information indicates a swaying motion of people.

11. The non-transitory computer-readable medium according to claim 9, further comprising displaying the motion map,
wherein the motion map contains the position information within one of a range from a current position of the computer or within a route provided by the computer.

12. The non-transitory computer-readable medium according to claim 9, further comprising warning of a possible swaying motion based on the position information, associated with the motion information, within a range from a current position of the computer.

* * * * *